United States Patent [19]

Kubbutat

[11] Patent Number: 5,326,513
[45] Date of Patent: Jul. 5, 1994

[54] PROCESS AND DEVICE FOR THE PRODUCTION OF PLASTIC FIBER BOARDS

[75] Inventor: Albert Kubbutat, Wittislingen, Fed. Rep. of Germany

[73] Assignee: Sto Poraver GmbH, Lauingen, Fed. Rep. of Germany

[21] Appl. No.: 752,576
[22] PCT Filed: Mar. 7, 1990
[86] PCT No.: PCT/EP90/00371
§ 371 Date: Sep. 9, 1991
§ 102(e) Date: Sep. 9, 1991
[87] PCT Pub. No.: WO90/10533
PCT Pub. Date: Sep. 20, 1990

[30] Foreign Application Priority Data

Mar. 8, 1989 [DE] Fed. Rep. of Germany ....... 3907521

[51] Int. Cl.$^5$ .................. B29C 67/22; E04G 15/00
[52] U.S. Cl. .................... 264/45.3; 264/109; 264/110; 249/35
[58] Field of Search ............ 249/35; 425/4 R; 264/45.3, 46.5, 109, 110; 52/309.4

[56] References Cited

U.S. PATENT DOCUMENTS

| 2,272,659 | 2/1942 | Daley | 249/35 |
|---|---|---|---|
| 3,525,663 | 8/1970 | Hale | 428/179 |
| 3,561,177 | 2/1971 | Agro et al. | 52/309.4 |
| 4,072,788 | 2/1978 | Herweg et al. | 264/45.3 |
| 4,120,923 | 10/1978 | Kloker et al. | 264/45.3 |
| 4,154,786 | 5/1979 | Plasse | 264/46.5 |
| 4,311,541 | 1/1982 | Fultz | 264/45.3 |
| 4,446,185 | 5/1984 | Waragai | 264/45.3 |
| 4,881,714 | 11/1989 | Koppenberg | 249/35 |

FOREIGN PATENT DOCUMENTS

| 1103554 | 3/1961 | Fed. Rep. of Germany . |
|---|---|---|
| 3217593A1 | 11/1983 | Fed. Rep. of Germany . |
| 3715487A1 | 11/1988 | Fed. Rep. of Germany . |
| 152173 | 10/1920 | United Kingdom . |
| 137974 | 12/1974 | United Kingdom . |

Primary Examiner—Allan R. Kuhns
Attorney, Agent, or Firm—Jacobson, Price, Holman & Stern

[57] ABSTRACT

A process and device for the manufacture of plastic fiber boards made of balls of expanded glass, expanded clay, pumice granules, mica, or a similar material and a foamed organic binder, such as epoxy resin, PU phenol resin, or the like. The binder is mixed with the balls, foamed, and hardened in a matrix space formed between two mold plates (1, 2) positioned at a distance one from the other. In order to obtain a particularly light but stable plastic fiber board, uniformly distributed recesses opening toward the internal sides of the plates are provided to contain the mixture located between the two mold plates during compression and before hardening. The device employed to implement the process includes two mold plates (1, 2), which are brought together in a press to compact the introduced therebetween. The inner surface of each mold plate (1, 2) is provided with a plurality of uniformly distributed, conical mold bodies (4, 5), whose cross-sections running parallel to the mold plate surface decreases in the direction of the other mold plate.

12 Claims, 1 Drawing Sheet

PROCESS AND DEVICE FOR THE PRODUCTION OF PLASTIC FIBER BOARDS

BACKGROUND OF THE INVENTION

The invention relates to a process, and a device for implementing the process for the production of plastic fiber boards using balls of expanded glass, expanded clay, pumice granules, mica, or a similar material and a foamed organic binder such as epoxy resin, PU phenol resin, or the like, or an inorganic binder, which is mixed with the balls, foamed, and then hardened between two mold plates positioned from each other at a given distance while a matrix is formed.

In a process of this type known to the prior art (DE-OS 37 15 487) the expanded glass ball artificial resin mixture fills the entire space bordered by the level mold plate surfaces, with the exception of small air space between the expanded glass balls. The weight of such plastic fiber boards and the quantity of material needed for their production basically depends on the material compression achieved by pressure applied to the material before hardening. As cores of sandwich elements, plastic fiber boards of this type, in which the cover layers serve as tension elements, are highly stable and have a high load-bearing capacity.

BRIEF SUMMARY OF THE INVENTION

The object of the invention to provide a process and device for producing plastic fiber boards as cores of sandwich elements, with comparative low plate weight and without impeding the carrying capacity during processing.

The process according to the invention is basically distinguished by the fact that a number of uniformly distributed recesses open in the direction of the plates are located between the two mold plates for receiving the plastic mixture before compression and hardening.

It has proven to be the case that plastic fiber boards with an especially low weight can be produced with this process, and they can be subjected to high loads as sandwich structure cores, despite the large number of hollow spaces they contain.

The invention also provides to a device for producing plastic fiber boards having two mold plates which are brought together in a press to compact the introduced mixture, the device being distinguished by the fact that the surface of at least one of the two mold plates is provided with a number of uniformly distributed mold bodies, whose cross-section, running parallel to the surface of the mold plate, decreases in the direction of the other mold plate.

The mold bodies employed can be, for example, semispherical mold bodies. A more favorable use of material, i.e. a greater stability with reduced consumption of material, is assured when the mold bodies are conical in shape.

It has proven to be particularly advantageous if both mold plates are outfitted with mold bodies. It is expedient for the mold bodies of one mold plate to be positioned in displaced fashion relative to those of the other mold plate; so that when the mold plates are drawn together, the mold bodies of the one mold plate project into the interstices between the mold bodies of the other mold plate.

A particularly suitable employment and distribution of material can be achieved if the bases of the conical mold bodies of the one mold plate, when projecting into the other mold plate, overlap the bases of the mold bodies of the latter mold plate.

In mounting the mold bodies it has proven to be advantageous if each mold body is provided on its base side with a threaded blind hole to receive a securing screw penetrating the corresponding mold plate.

To properly secure the mold bodies to the mold plate even when they have a small diameter and to also assure a precise distribution of the mold bodies on either mold plate, it has proven to be effective to provide each conical mold body with a cylindrical foot whose diameter corresponds to the diameter of the conical base and to position beside each mold plate a perforated plate with holes, whose diameter matches the diameter of the conical bases. Here the perforated plate will expediently have a thickness corresponding to the height of the cylindrical feet of the conical mold bodies.

In an effective embodiment of the device according to the invention the mold receiving the mold plates includes a support plate with a frame and a pressure plate, and the common height of the two mold plates and one mold body is between $\frac{2}{3}$ and $\frac{3}{4}$ of the height of the frame. When the lower half of the mold encompassing the frame is filled to the top of the conical mold bodies with the mixture, the other, upper mold plate can be lowered and its conical mold bodies immersed in this granular material between the mold bodies of the other mold plate, compressing the material and effectively eliminating the danger that material displaced while the mold is being closed will escape via the frame to reach the outside.

An embodiment of the invention which has proven to be particularly effective structurally due to its simplicity and particularly advantageous with respect to the smooth relative coordination of the mold parts is one in which the frame is designed as an angular frame and one angled rim of the pressure plate overlaps this angular frame. The pressure plate rim helps absorb the large forces arising during compression, which tend to deform the angled rim in the outward direction.

BRIEF DESCRIPTION OF THE DRAWINGS

Further details, advantages, and features of the invention will be understood from the following description with reference to the accompanying drawing, wherein.

DETAILED DESCRIPTION

Figure 1:
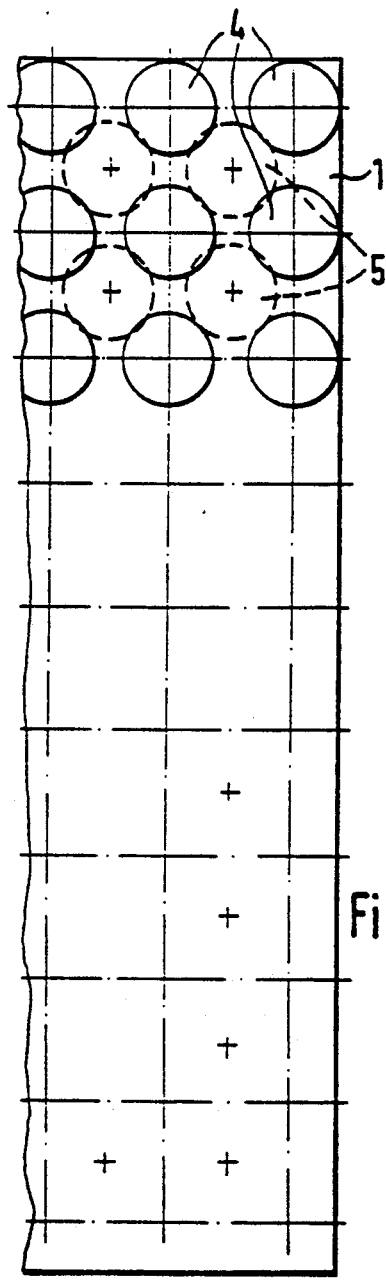
FIG. 1 is a top seen view on of the rim area of a mold plate equipped with conical mold bodies.
Figure 2:
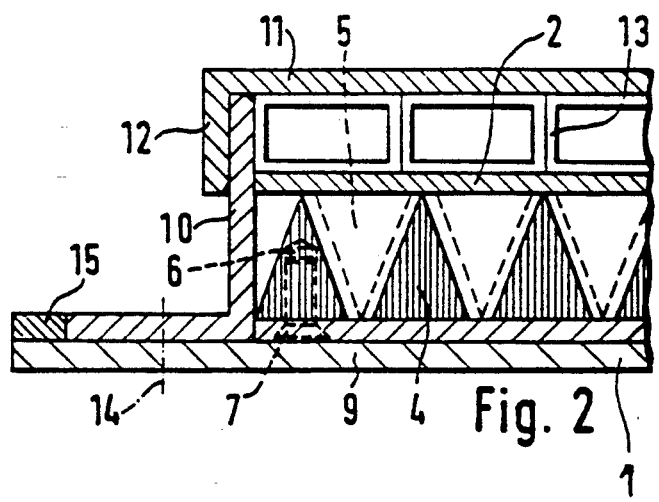
FIG. 2 is a cross-sectional view through the rim area of a mold containing the mold plate according to FIG. 1.

As can be seen from the drawing, the inventive device for the production of plastic fiber boards comprises two mold plates 1, 2, which can be brought together in a press (not shown in greater detail), while mixture 3 of expanded glass balls and synthetic resin located between them is compressed. Each of the two mold plates 1, 2 is equipped with a plurality of uniformly distributed mold bodies 4, 5 which are conical in shape, such that their cross-section parallel to the mold plate surface decreases in the direction of the other mold plate. The mold bodies 4 of mold plate 1 are positioned in offset fashion relative to the mold bodies 5 of the other plate 2. FIGS. 1 and 2 together show particularly clearly that when the mold plates 1, 2 are in closed position, the mold bodies 5 of plate 2 project into the interstices between the mold bodies 4 of the other plate 1. The intersecting points of the axes of mold bodies 4 with mold plate 1 form the corners of square, and the intersecting points of the axes of the analogously positioned mold bodies 5 of mold plate 2 rest exactly in the center of these squares, i.e. are covered by the point of intersection of the diagonals of these squares. In addition, the mold bodies 4 or 5 are expediently dimensioned and positioned one relative to the other, so that the bases of the conical mold bodies 4 and 5 of mold plate 1 and 2 overlap, in projecting onto the other mold plate as clearly shown in FIG. 1. To attach the mold body 4 or 5 to the corresponding mold plate 1 or 2, each mold body is provided on its base side with a threaded blind hole 6, which serves to receive a securing screw 7 running through a hole in the corresponding mold plate. In the embodiment according to FIG. 2, the conical mold bodies have dimensions such that they can be attached with an M6 screw, with their bases resting directly on the mold plate. The mold bodies have bases with a diameter of about 20 mm and a height of about 25 mm, permitting the threaded blind hole 6 to be drilled with sufficient depth.

Figure 4A:
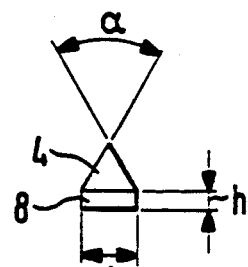
FIGS. 4a, 4b and 4c show three spherical mold bodies of differing dimensions for the mold according to FIG. 3.
Figure 4B:
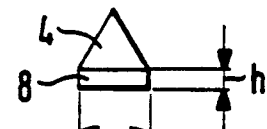
Figure 4C:
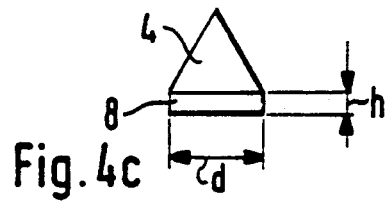
Figure 3:
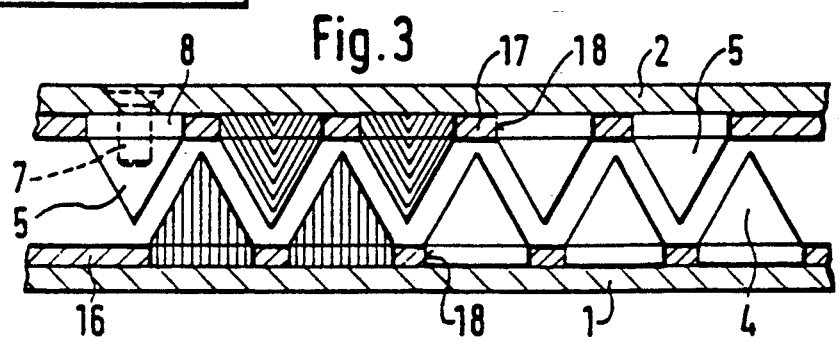
FIG. 3 is a cross-sectional view through the pressure plates of a mold according to a modified embodiment for the production of plastic fiber boards of reduced thickness.

In the embodiment shown in FIG. 3, conical mold bodies are employed whose bases have smaller diameters i.e. 8 mm (FIG. 4a), 10 mm (FIG. 4b), and 15 mm (FIG. 4c). In addition, the surface lines of the conical mold bodies describe an angle a of 60°, the cone angle. Here the conical mold bodies include a cylindrical foot 8, with a diameter d which matches the diameter of the conical base and a height h. In this fashion the mold bodies obtain an adequate height, thereby making it possible to provide them with threaded blind holes 6 to receive threaded screw M47 (FIGS. 4a and 4b) or M5 (FIG. 4c). Attachment of the conical mold body with foot 8, as in FIG. 4c, to the corresponding mold pate 2 by means of an M5 screw 7 is indicated in FIG. 3.

In the initial embodiment according to FIGS. 1 and 2 of the mold receiving the mold plates includes a support plate 9 with an angular frame 10 and a pressure plate 11, which overlaps the angular frame 10 with an elbowed (i.e. in cross section) pressure plate rim 12. As can be seen, a tube bundle serving to equalize the height is inserted between the upper mold plate 2 and the pressure plate 11. This measure assures that the total height of the two mold plates 1 and 2, whose thickness is about 5 mm, and that of one of the mold bodies 4 or 5, about 25 mm, thus together about 35 mm, is between ⅔ and ½ of the 50 mm height of the angular frame.

Once the mold plates 1 and 2 are brought together after filling with the mixture of expanded glass granulate and artificial resin, up to the height of the tip of the conical mold body 4, granulates cannot reach the outside from the rim of the angular frame 10. Rather, the material is heavily compressed as the mold plates 1 and 2 approach each other. The resulting forces, which run parallel to the plane of the mold pates 1, 2 are absorbed by the angular frame 10 and by the rim 12 of the pressure plate overlapping angular frame 10. The angular frame 10, which is tightly secured to the support plate 9, such as by screws or bolts (not shown) on center lines 14 for example is additionally secured against displacement on the plane of the support plate by means of a spacer, or backing member 15 firmly attached to the support plate 9 such as by screws or bolts (not shown).

When the molding process is complete, a plastic fiber board can be removed from the two mold plates 1, 2 which displays a number of equally distributed conically shaped recesses that open in opposite directions toward the outer surface of the board, but which is distinguished by its particularly light weight and its high load-bearing capacity.

In the embodiment according to FIG. 3, in which the conical mold bodies 4 and 5 shown in FIG. 4c are employed, perforated plates 16 and 17 with holes 18 are positioned on each mold plate 1 and 2; the diameter holes 18 of the perforated plates matches the diameter of the cylindrical feet 8 and thus the conical bases. The thickness of the perforated plates 16 or 17 corresponds to the height h of the cylindrical feet 8 of the conical mold bodies 4 and 5. The perforated plates 16, 17 positioned on the mold plates 1 and 2 determine the thickness of the plastic fiber boards produced with the mold according to FIGS. 4a, 4b and 4c. They also serve jointly with the securing screws 7 to assure precise alignment and positioning relative to each other and to the mold plates 1 and 2 supporting them.

I claim:

1. Process for producing plastic fiber boards comprising:
   providing a material selected from the group consisting of balls of expanded glass, expanded clay, pumice granules and mica;
   providing a foaming and hardenable binder selected from the group consisting of organic and inorganic binders, said organic binder being selected from the group consisting of epoxy resin and PU phenol resin;
   mixing said material with said binder to from a mixture thereof;
   providing two mold plates in relative spaced relation and for relative movement with respect to each other;
   providing a plurality of mold bodies in relative spaced relation on each mold plate to form interstices between said mold bodies on each mold plate with said mold bodies projecting into the space between said mold plates and in interfitting spaced relation in said interstices in said mold bodies on the other mold plate forming a matrix space between said mold plate and mold bodies;
   adding said mixture into said matrix space between said mold plates and mold bodies;
   compressing said mixture in said matrix space by moving said mold plates toward each other;
   foaming and hardening said binder in situ in said matrix space thereby forming a plastic fiber board having spaced recesses on opposite sides thereof.

2. Process for producing plastic fiber boards comprising:
   providing a material selected from the group consisting of balls of expanded glass, expanded clay, pumice granules and mica;
   providing a foaming and hardenable binder selected from the group consisting of organic and inorganic binders, said organic binder being selected form the group consisting of epoxy resin and PU phenol resin;

mixing said material with said binder to form a mixture thereof;

providing two mold plates in relative spaced relation and for relative movement with respect to each other;

providing a plurality of mold bodies in relative spaced relation on at least one of said mold plates projecting into the space between said two mold plates to form a matrix space between said mold plates and mold bodies;

adding said mixture into said matrix space between said mold plates and mold bodies;

compressing said mixture in said matrix space by moving said mold plates toward each other; and foaming and hardening said binder in situ in said matrix space thereby forming a plastic fiber board having spaced recesses on at least one side thereof.

3. Device for manufacture of plastic fiber boards comprising:

two mold plates in relative spaced relation having inner facing surfaces forming a molding space therebetween and adapted for use in a press;

a plurality of mold bodies distributed in relative spaced relation on the inner surface of at least one of said mold plates, each mold body having a cross section thereof extending parallel to said inner surface decreasing in the direction of the other mold plate;

a base side on each mold body;

a screw threaded bore in said base side of each mold body;

a plurality of spaced holes in said at least one mold plate; and a threaded screw extending through each hole and engaging with said threaded bore in a mold body for securing said mold bodies to said at least one mold plate.

4. Device for manufacture of plastic fiber boards comprising:

two mold plates in relative spaced relation having inner facing surfaces to form a molding space therebetween and adapted for use in a press;

a plurality of conically shaped mold bodies distributed in relative spaced relation on the inner surfaces of said mold plates, each mold body having a cross section thereof extending parallel to said inner surface decreasing in the direction of the other mold plate, said mold bodies on one of said mold plates being offset with respect to said mold bodies on the other of said mold plates and having a height so that when said mold plates are in closed position for use, said mold bodies on each mold plate project into interstices between said mold bodies on the other mold plate;

bases on said conically shaped mold bodies disposed on each mold plate so that perpendicular projections of said bases on one mold plate onto the other mold plate overlap said bases on said other mold plate;

a base side on each mold body;

a screw threaded bore in said base side of each mold body;

a plurality of spaced holes in each of said mold plates; and a threaded screw extending through each hole and engaging with said threaded bore in a mold body for securing said mold bodies to said mold plates.

5. Device for manufacture of plastic fiber boards comprising:

two mold plates in relative spaced relation having inner facing surfaces to form a molding space therebetween and adapted for use in a press;

a plurality of conically shaped mold bodies distributed in relative spaced relation on the inner surface of at least one of said mold plates, each mold body having a cross section thereof extending parallel to said inner surface decreasing in the direction of the other mold plate;

a base on each mold body;

a cylindrical foot extending from said base of each conically shaped mold body having a diameter equal to the diameter of said base;

a spacer plate on said inner surface of said at least one of said mold plates; and a plurality of holes in said spacer plate having diameters corresponding to said diameters of said cylindrical feet for receiving said cylindrical feet therein.

6. The device as claimed in claim 4 and further comprising:

a cylindrical foot extending from the base of each conically shaped mold body having a diameter equal to the diameter of said base;

a spacer plate on said inner surface of said at least one of said mold plates; and a plurality of holes in said spacer plate having diameters corresponding to said diameters of said cylindrical feed for receiving said cylindrical feet therein.

7. The device as claimed in claim 5 wherein:

said spacer plate has a thickness substantially equal to the height of said cylindrical foot extending form said base of said conically shaped mold body.

8. The device as claimed in claim 6 wherein:

said spacer plate has a thickness substantially equal to the height of said cylindrical foot extending from said base of said conically shaped mold body.

9. Device for manufacture of plastic fiber boards comprising:

two mold plates in relative spaced relation having inner facing surfaces to form a molding space therebetween and adapted for use in a press;

a plurality of mold bodies distributed in relative spaced relation on the inner surface of at least one of said mold plates, each mold body having a cross section thereof extending parallel to said inner surface decreasing in the direction of the other mold plate; and a mold for receiving said mold plates comprising,
a support plate for supporting one of said mold plates,
frame means on said support plate extending in height from said support plate in the direction of the other of said mold plates and around said mold plates and mold bodies, and pressure plate means for exerting a force on said other of said mold plates;

each mold plate having a thickness so that the total of said thicknesses of said mold plates and the height of said mold bodies form said at least one of said mold plates in the direction of said other of said mold plates is in the range of $\frac{2}{3}$ to $\frac{3}{4}$ of the height of said frame means.

10. The device as claimed in claim 8 and further comprising a mold for receiving said mold plates, said mold comprising:
- a support plate for supporting one of said mold plates;
- frame means on said support plate extending in height from said support plate in the direction of the other of said mold plates and around said mold plates and mold bodies; and
- pressure plate means for exerting a force on said other of said mold plates;
- said mold plates each having a thickness so that the total of said thicknesses of said mold plates and the height of said mold bodies form said at least one of said mold plates in the direction of said other of said mold plates is in the range of ⅔ to ¾ of the height of said frame means.

11. The device as claimed in claim 9 wherein:
said pressure plate means has an angular portion extending therefrom toward said support plate and around said frame means for laterally supporting said frame means.

12. The device as claimed in claim 10 wherein:
said pressure plate means has an angular portion extending therefrom toward said support plate and around said frame means for laterally supporting said frame means.

* * * * *